(12) United States Patent
Hao et al.

(10) Patent No.: US 11,482,954 B2
(45) Date of Patent: Oct. 25, 2022

(54) SYSTEM AND METHOD FOR GENERATING HEATING AC CURRENT

(71) Applicant: GM GLOBAL TECHNOLOGY OPERATIONS LLC, Detroit, MI (US)

(72) Inventors: Lei Hao, Troy, MI (US); Neeraj S. Shidore, Novi, MI (US); Suresh Gopalakrishnan, Troy, MI (US); Chandra S. Namuduri, Troy, MI (US); Venkatesh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 17/099,915

(22) Filed: Nov. 17, 2020

(65) Prior Publication Data

US 2022/0158574 A1 May 19, 2022

(51) Int. Cl.
*H02P 1/00* (2006.01)
*H02P 6/28* (2016.01)
*H02P 6/16* (2016.01)
*B60L 58/27* (2019.01)
*B60L 53/20* (2019.01)
*H01M 10/625* (2014.01)
*H01M 10/6571* (2014.01)
*H01M 10/66* (2014.01)
*H01M 10/615* (2014.01)

(52) U.S. Cl.
CPC ............... *H02P 6/28* (2016.02); *B60L 53/20* (2019.02); *B60L 58/27* (2019.02); *H01M 10/615* (2015.04); *H01M 10/625* (2015.04); *H01M 10/6571* (2015.04); *H01M 10/66* (2015.04); *H02P 6/16* (2013.01); *B60L 2210/30* (2013.01); *H01M 2220/20* (2013.01)

(58) Field of Classification Search
CPC .... H02P 6/28; H02P 6/16; H02P 27/08; H02P 27/06; H01M 10/615; H01M 10/625; H01M 10/6571; H01M 10/66; H01M 2220/20; B60L 53/20; B60L 58/27; B60L 2210/30
See application file for complete search history.

(56) References Cited

FOREIGN PATENT DOCUMENTS

| CN | 111355001 A | * | 6/2020 | |
|---|---|---|---|---|
| CN | 111347928 B | * | 9/2021 | |
| WO | WO-2020125626 A1 | * | 6/2020 | ............... B60K 1/00 |

* cited by examiner

*Primary Examiner* — Karen Masih (57) ABSTRACT

An apparatus for heating a DC battery in a vehicle including an electric motor. The apparatus comprises an AC generating module coupled to the battery and the electric motor that generates three AC phases. The first, second, and third AC phases are applied to first, second, and third windings of the electric motor, respectively. The first, second, and third AC phases create zero torque in the electric motor because the first AC phase amplitude is equal to the sum of the second and third AC phase amplitudes and the second and third AC phases are 180 degrees out of phase with the first AC phase. The AC generating module creates a heating alternating current in the DC battery.

20 Claims, 6 Drawing Sheets

SYSTEM AND METHOD FOR GENERATING HEATING AC CURRENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system for heating a vehicle battery using AC current generated from a DC voltage bus. It is desirable to generate AC current using an inverter DC bus to heat rapidly a vehicle battery at cold ambient temperature. It also is desirable to provide heat to the vehicle cabin if the motor, battery and cabin loops are coupled. Moreover, it is desirable to control the machine torque near zero at any rotor position using the AC current in the inverter DC bus.

SUMMARY

It is an object of the present disclosure to provide a system for heating a DC battery in a vehicle including an electric motor. The apparatus comprises: i) an alternating current (AC) generating module coupled to the battery and the electric motor and configured to generate three alternating current (AC) phases. A first AC phase is applied to a first winding of the electric motor, a second AC phase is applied to a second winding of the electric motor, and a third AC phase is applied to a third winding of the electric motor. The first AC phase, the second AC phase, and the third AC phase create substantially zero torque in the electric motor and the AC generating module creates a heating alternating current in the DC battery.

In one embodiment, the first AC phase has a first amplitude, the second AC phase has a second amplitude, and the third AC phase has a third amplitude and wherein the first amplitude is substantially equal to the sum of the second and third amplitudes.

In another embodiment, the first AC phase has a first phase, the second AC phase has a second phase, and the third AC phase has a third phase, wherein the second and third phases are substantially equal to 180 degrees out of phase with the first phase.

In still another embodiment, the AC generating module comprises a rotor position sensor configured to detect a position of a rotor of the electric motor and a control module configured to receive the detected rotor position from the rotor position sensor, wherein the control module generates the first AC phase, the second AC phase, and the third AC phase based on the detected rotor position.

In yet another embodiment, the AC generating module further comprises a plurality of phase current sensors configured to detect the first AC phase in the first winding, the second AC phase in the second winding, and the third AC phase in the third winding, and wherein the control module adjusts the first AC phase, the second AC phase, and the third AC phase based on the detected first AC phase, the detected second AC phase and the detected third AC phase.

In a further embodiment, the AC generating module further comprises a three phase inverter comprising a plurality of switches, wherein the plurality of switches comprises: i) a first switch and a second switch configured to couple the first winding to the positive terminal and the negative terminal of the battery, respectively, ii) a third switch and a fourth switch configured to couple the second winding to the positive terminal and the negative terminal of the battery, respectively, and iii) a fifth switch and a fourth switch configured to couple the third winding to the positive terminal and the negative terminal of the battery, respectively.

In a still further embodiment, the control module comprises switch-driving circuitry coupled to the plurality of switches and configured to generate a plurality of pulse-width modulated (PWM) signals that control the opening and closing of the plurality of switches.

In a yet further embodiment, the control module is configured to receive a detected temperature of the battery and wherein the control module causes the AC generating module to generate the first AC phase, the second AC phase, and the third AC phase when the detected temperature is less than a threshold value.

It is an object of the present disclosure to provide a vehicle system comprising: i) an electric motor; ii) a DC battery for supplying power to the electric motor; and iii) an apparatus for heating the DC battery when the temperature of the DC battery is less than a threshold value. The apparatus comprises an alternating current (AC) generating module coupled to the battery and the electric motor and configured to generate three alternating current (AC) phases. A first AC phase is applied to a first winding of the electric motor, a second AC phase is applied to a second winding of the electric motor, and a third AC phase is applied to a third winding of the electric motor. The first AC phase, the second AC phase, and the third AC phase create substantially zero torque in the electric motor and the AC generating module creates a heating alternating current in the DC battery.

It is still another object of the present disclosure to provide a method for heating a DC battery in a vehicle including an electric motor. The method comprises: i) generating three alternating current (AC) phases; ii) applying a first AC phase to a first winding of the electric motor; iii) applying a second AC phase to a second winding of the electric motor; and iv) applying a third AC phase to a third winding of the electric motor. The first AC phase, the second AC phase, and the third AC phase create substantially zero torque in the electric motor. Generating the three AC phases creates a heating alternating current in the DC battery.

In one embodiment, the method further comprises: i) detecting a position of a rotor of the electric motor; and ii) generating the first AC phase, the second AC phase, and the third AC phase based on the detected rotor position.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure is directed to an apparatus and method using a vehicle power inverter and machine windings to generate alternating current (AC) in the power inverter direct current (DC) bus in order to rapidly heat a battery while controlling machine torque close to zero. Advantageously, the apparatus generates the AC current in the inverter DC bus at any rotor position. Advantageously, the disclosed apparatus and method provide the ability to heat the battery and eliminate the need for external convective heating (e.g., an external heater).

Normally, electric machine drives use three phase-balanced currents to generate a rotating field so that the machine spins with positive torque. However, the phase-balanced currents cause a DC current in the inverter bus, which cannot be used for rapid battery heating. To generate AC current in inverter DC bus, the disclosed apparatus and method use three unique phase currents that add up to zero current at any point in time. This is accomplished by setting one phase current (e.g., ϕA) as the reference phase and the reference amplitude. The apparatus generates the other phase currents (e.g., ϕB and ϕC) to be 180 degrees out of phase with ϕA and with amplitudes that add to the amplitude of ϕA amplitude. Conceptually, this may also be described that the other phase currents (e.g., ϕB and ϕC) are in-phase with ϕA and with amplitudes that add to the negative of the amplitude of ϕA. Thus, two phase currents are always in the opposite direction of the other phase and the sum of all three phase currents is zero at any time. The proposed three phase currents generate a pulsation field and the machine torque due to the pulsation field may vary depending on the initial rotor position.

Figure 1:
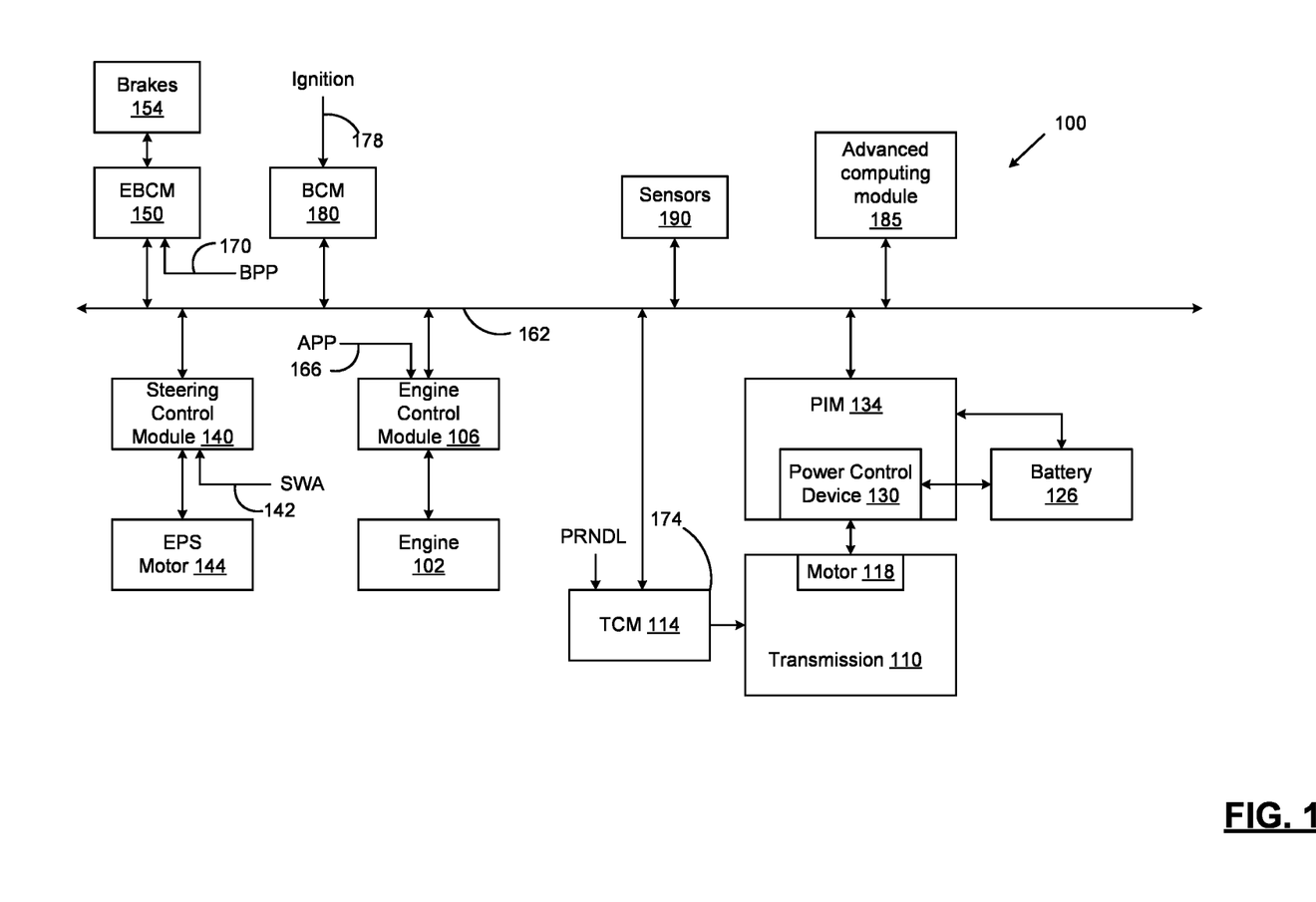
FIG. 1 is a functional block diagram of an exemplary vehicle system that includes an AC generating module according to an embodiment of the present disclosure.

FIG. 1 is a functional block diagram of an exemplary vehicle system 100 that includes an AC generating module according to an embodiment of the present disclosure. While a vehicle system for a manually driven hybrid vehicle is shown and described, the present disclosure is also applicable to autonomously driven vehicles and to all-electric vehicles. The present disclosure may also be applicable to non-automobile implementations, such as trains, boats and aircraft.

An engine 102 combusts an air/fuel mixture to generate drive torque. An engine control module (ECM) 106 controls the engine 102 based on one or more driver or vehicle inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system 100 may include one or more electric motors. For example, an electric motor 118 may be implemented within the transmission 110 as shown in the example of FIG. 1A. An electric motor can act either as a generator or as a motor at a given time. When acting as a generator, an electric motor converts mechanical energy into electrical energy. The electrical energy may charge a battery 126 via a power control device (PCD) 130. When acting as a motor, an electric motor generates torque that supplements or replaces torque output by the engine 102. While the example of one electric motor is provided, the vehicle may include zero or more than one electric motor. Further, the vehicle system 100 can be pure electric vehicle and there is no engine, instead electric machine generates torque to drive vehicle.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 signal based on the position of the steering wheel. As an example, the steering control module 140 may control vehicle steering via an EPS motor 144 based on the SWA 142 signal. However, the vehicle may include another type of steering system. An electronic brake control module (EBCM) 150 may selectively control brakes 154 of the vehicle.

Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 that may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

According to an exemplary embodiment of the present disclosure, the vehicle system 100 further comprises an advanced computing module 185 and a sensors module 190. As will be explained in greater detail below, the sensors module 190 includes a plurality of sensors distributed through the vehicle system 100 that gather important information. The sensor information includes, for example, wheel speed data, steering wheel angle sensor data, brake status data, LiDAR system data, radar data, camera images, GPS data, accelerometer data, engine temperature and RPM, and the like to determine the speed, direction, and location of the vehicle system 100. In particular, the sensors module 190 may include a plurality of phase current sensors and a rotor position sensor associated with the electric rotor 118 and a plurality of battery sensors to monitor, for example, battery temperature (T), current (I), and voltage (V).

The advanced computing module 185 comprises a high performance computing platform that controls many of the higher order functions and lower order functions of the vehicle system 100. In a typical implementation, the advanced computing module 185 may be implemented as a microprocessor and an associated memory. The advanced computing module 185 executes a kernel program that controls the overall operation of the advanced computing module 185.

According to the principles of the present disclosure, the advanced computing module 185 may direct an alternating current (AC) generating module to generate AC current that heats the battery 126 without producing torque in the motor 118. In an exemplary embodiment, the AC generating module may be a part of the power inverter module (PIM) 134 that controls the electric motor 118 and the PCD 130. The advanced computing module 185 may determine from sensor information that the temperature of the battery 126 is too low and may direct the AC generating module to apply the AC current to generate heat in the battery. When the battery temperature exceeds a minimum threshold, the advanced computing module 185 may direct the AC generating module to stop generating the AC current.

Figure 2A:
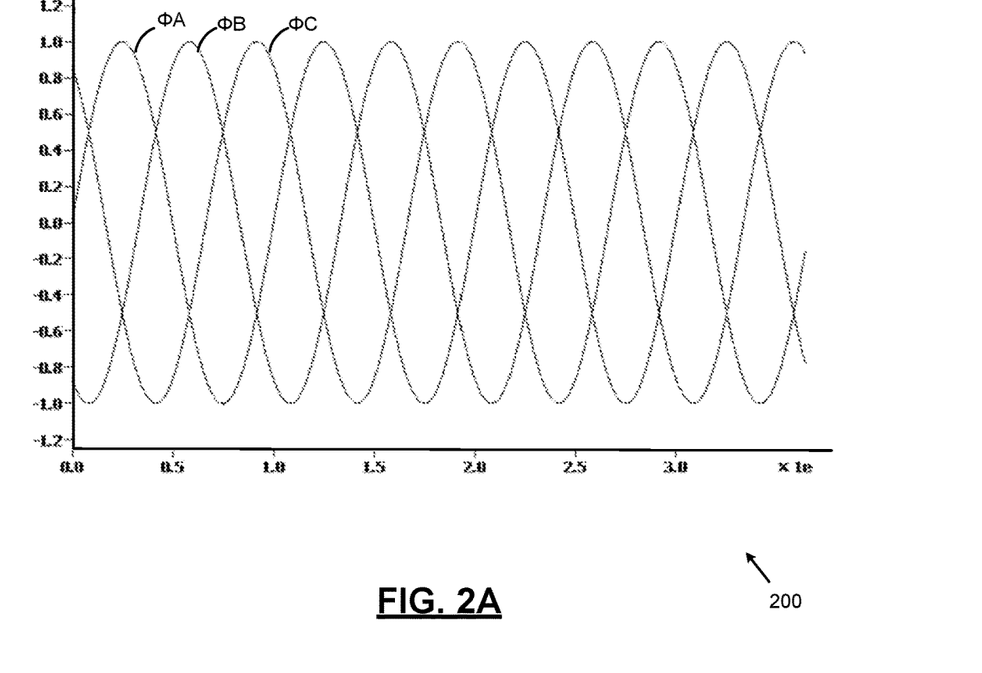
FIG. 2A is a timing diagram of a conventional three phase balanced current.

FIG. 2A is a timing diagram 200 of conventional three phase balanced currents generated by a power inverter control module (PIM) 134 through PCD 130. The three phases comprise a first phase current (ϕA), a second phase current (ϕB), and a third phase current (ϕC) operating at an exemplary frequency of 100 Hz. The horizontal axis of timing diagram 200 gives time in hundredths of seconds. Assuming the ϕA current is the reference, then the ϕA current is at 0 degrees phase and an amplitude of 1.0, the ϕB current is at 120 degrees phase and an amplitude of 1.0, and the ϕC current is at 240 degrees phase and an amplitude of 1.0. This type of three phase balanced current only results in the DC current in battery terminal and cannot generate AC current in battery terminal.

Figure 2B:
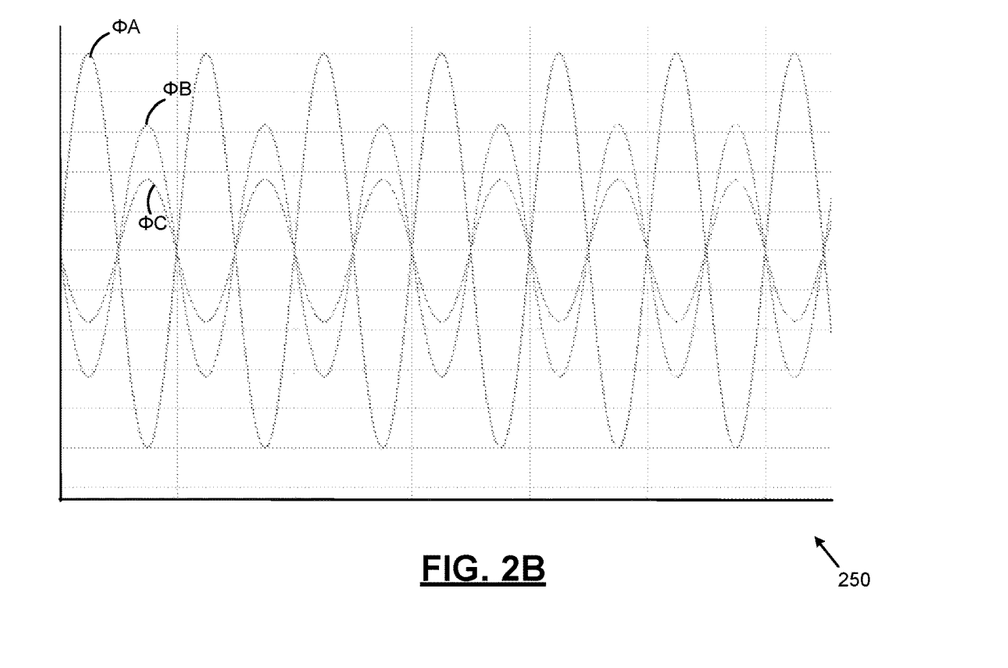
FIG. 2B is a timing diagram of the proposed three phase current according to an embodiment of the present disclosure.

FIG. 2B is a timing diagram 250 of the proposed three phase currents generated by a power inverter control module (PIM) 134 through PCD 130 according to an embodiment of the present disclosure. Assuming the ϕA current is the reference, the ϕA current is 0 degrees phase and an amplitude of 1.0. However, the ϕB current and the ϕC current has same phase and are now at 180 degree phase shift out of phase A. In addition, the sum of the amplitudes of the ϕB current and the ϕC current are equal to the amplitude of the ϕA current. For example, the ϕB current may be 0.65 and the ϕC current may be 0.35. Because the ϕB and ϕC currents are in the opposite direction to the ϕA current (i.e., are negative with respect to ϕA), the three phases sum to zero (i.e., 1.0−(0.65+0.35)=0 Amps. Therefore, AC current is generated in battery terminal and the AC currents rapidly generate heat in the battery 126.

Figure 3:
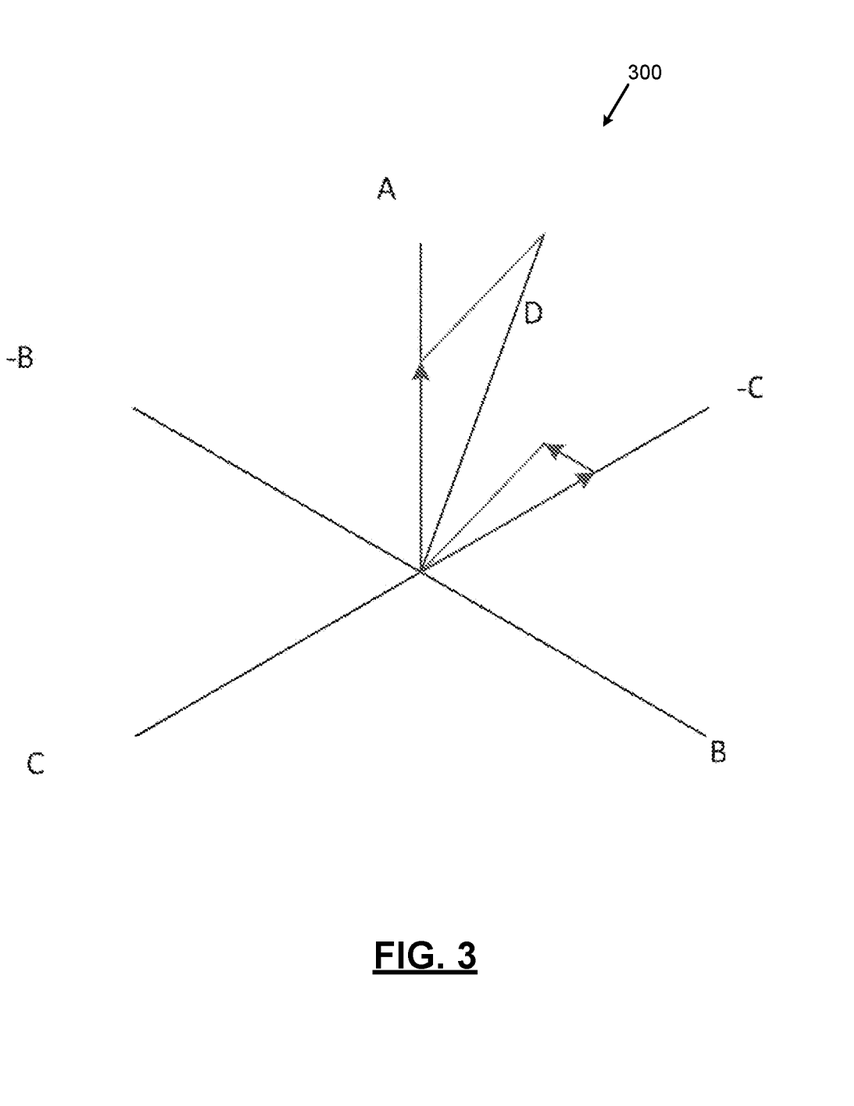
FIG. 3 is a graph demonstrating D-axis alignment using different current amplitudes according to an embodiment of the present disclosure.

FIG. 3 is a graph 300 demonstrating D-axis alignment using different current amplitudes according to an embodiment of the present disclosure. The D-axis 340 represents a direct axis in a machine d and q synchronous reference frame. The vector 310 represents the ϕA current. The vector 320 represents the ϕB current. The vector 330 represents the ϕC current. As the vectors 310, 320, and 330 show, it is always possible to align the current vector with the D-axis by controlling the ratio of amplitudes of the three current phases. The position of direct axis in the machine d and q synchronous reference frame can be different every time after vehicle is parked, but fixed at one position, assuming the machine is in standstill and generates zero torque. Since the machine current vector can be controlled to align with the D-axis frame if the position of D-axis is known, the machine q-axis current is always zero. Therefore, the machine torque will be substantially equal to zero, regardless of the amplitude of the phase current. In other words, for any given rotor position, by specifically selecting the ratio of amplitudes of three phase currents based on rotor position as shown in FIG. 2B, it is always possible to align the current vector to the D-axis and generate zero torque, regardless of the real values of the amplitudes of the phase currents.

Figure 4:
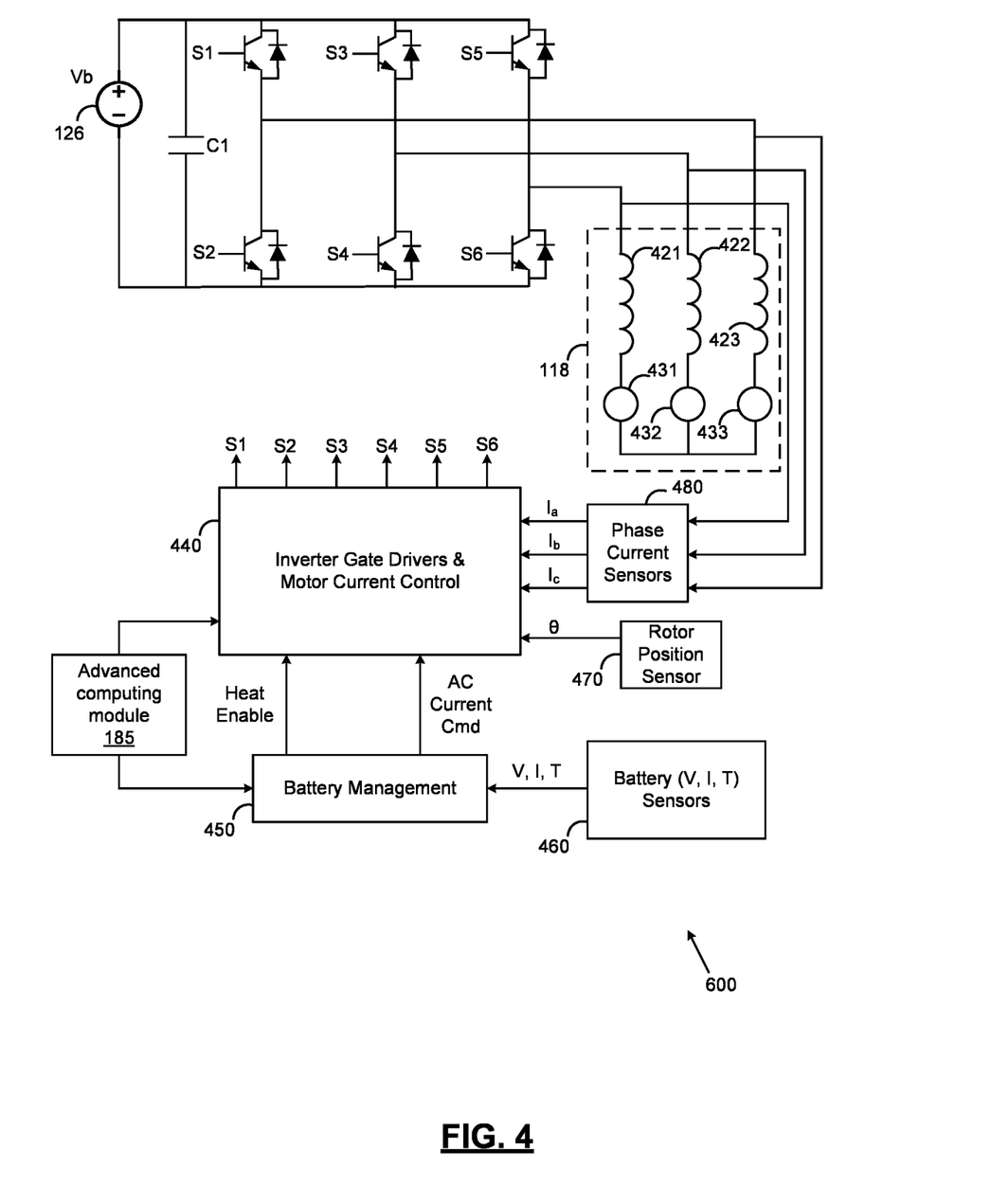
FIG. 4 is a schematic diagram illustrating an AC generating module according to an embodiment of the present disclosure.

FIG. 4 is a schematic diagram illustrating an AC generating module 400 according to an embodiment of the present disclosure. The AC generating module 400 comprises the battery 126, a capacitor C1, a three-phrase inverter comprising six switches S1-S6, an inverter gate drivers & motor current control module 440, battery management module 450, battery sensors 460, rotor position sensor 470, and phase current sensors 480.

In FIG. 4, the advanced computing module 185 may control (e.g., activate/deactivate) the AC generating module 400 in response to temperature values received from the battery sensors module 460. In addition, in FIG. 4, each of the windings of the electric motor 118 is represented by an inductance and a back electro-motive force (EMF). For example, a first motor winding is represented by inductance 421 and back EMF 431. A second motor winding is represented by inductance 422 and back EMF 432. The third motor winding is represented by inductance 423 and back EMF 433.

The inverter gate drivers & motor current control module 440 produce the gate control signals S1-S6 that control the switches S1-S6, respectively. Switches S1 and S2 couple the third motor winding to the positive terminal or the negative terminal of the battery 126, respectively. Switches S3 and S4 couple the second motor winding to the positive terminal or the negative terminal of the battery 126, respectively. Switches S5 and S6 couple the third motor winding to the positive terminal or the negative terminal of the battery 126, respectively.

The battery management module 450 receives voltage (V), current (I), and temperature (T) measurements from the battery sensors module 460. In response to a command from the advanced computing module 185, the battery management module 450 may generate a Heat Enable signal and an AC Current Command signal. The inverter gate drivers & motor current control module 440 is activated by the Heat Enable signal. The inverter gate drivers & motor current control module 440 also receives the AC Current Command signal, which adjusts the amount of current generated by the AC generating module 400.

The inverter gate drivers & motor current control module 440 generates pulse-width modulated (PWM) signals on the switch control signals S1-S6 outputs. The PWM signals selectively open and close the switches S1-S6 in the three phase inverter to generate the sinusoidal phase currents in FIG. 2B. The sinusoidal phase currents are generated based on the rotor position (θ) detected by the rotor position sensor 470 and the phase currents $I_a$, $I_b$, and $I_c$, detected by the phase current sensors module 480.

Figure 5:
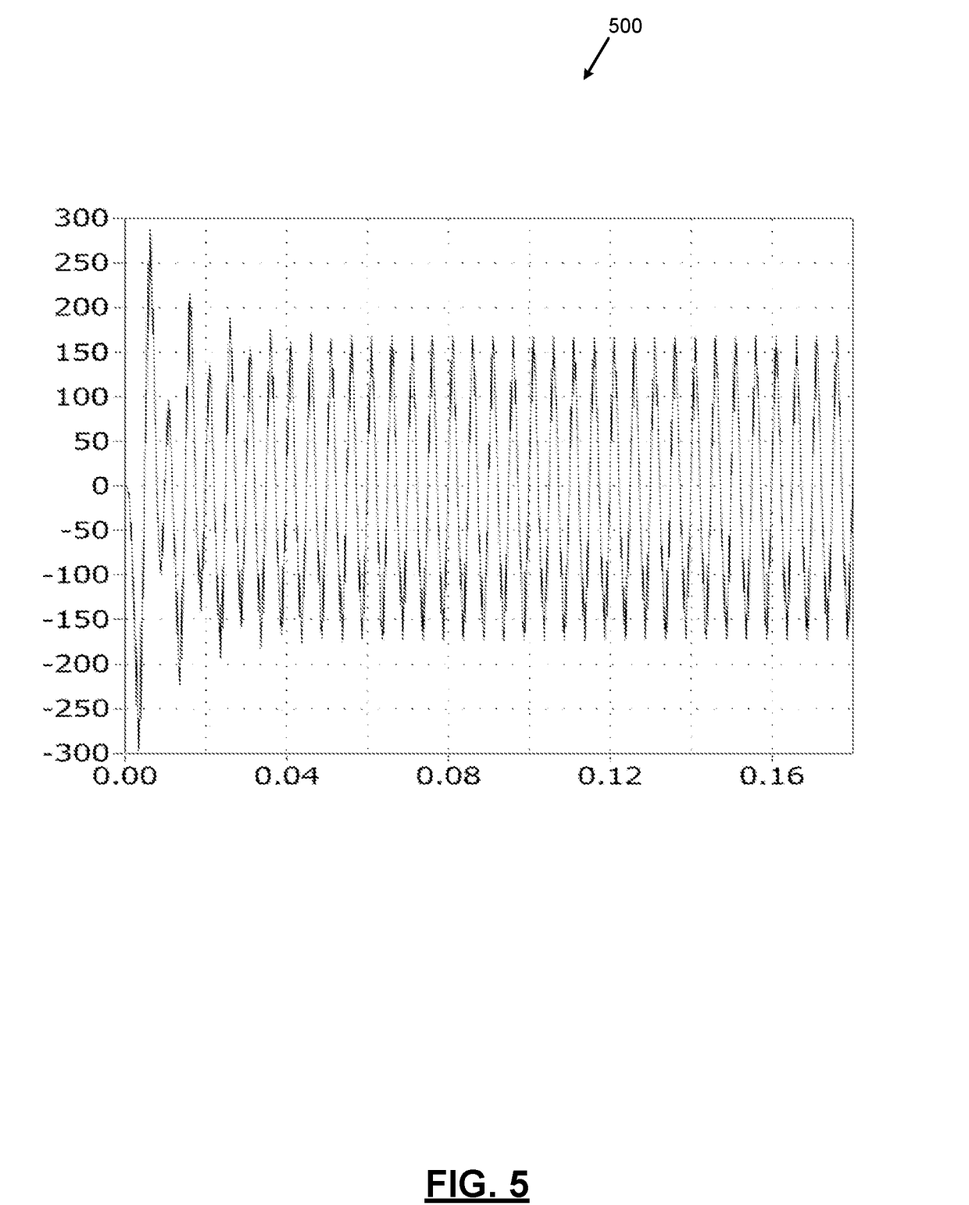
FIG. 5 is a timing diagram illustrating battery current according to an embodiment of the present disclosure.

FIG. 5 is a timing diagram 500 illustrating AC battery current according to an embodiment of the present disclosure. The AC battery current is generated in the terminal of the battery 126 and may have an amplitude less than the individual phase currents (ϕA, ϕB, ϕC) due to the capacitor C1. After an initial startup period, the amplitude of the AC battery current settles to a steady peak-to-peak value. The AC battery current in FIG. 5 generates heat in the battery 126, but because the machine three phase currents can be controlled to align with D-axis, no torque is generated in the electric motor 118.

Figure 6:
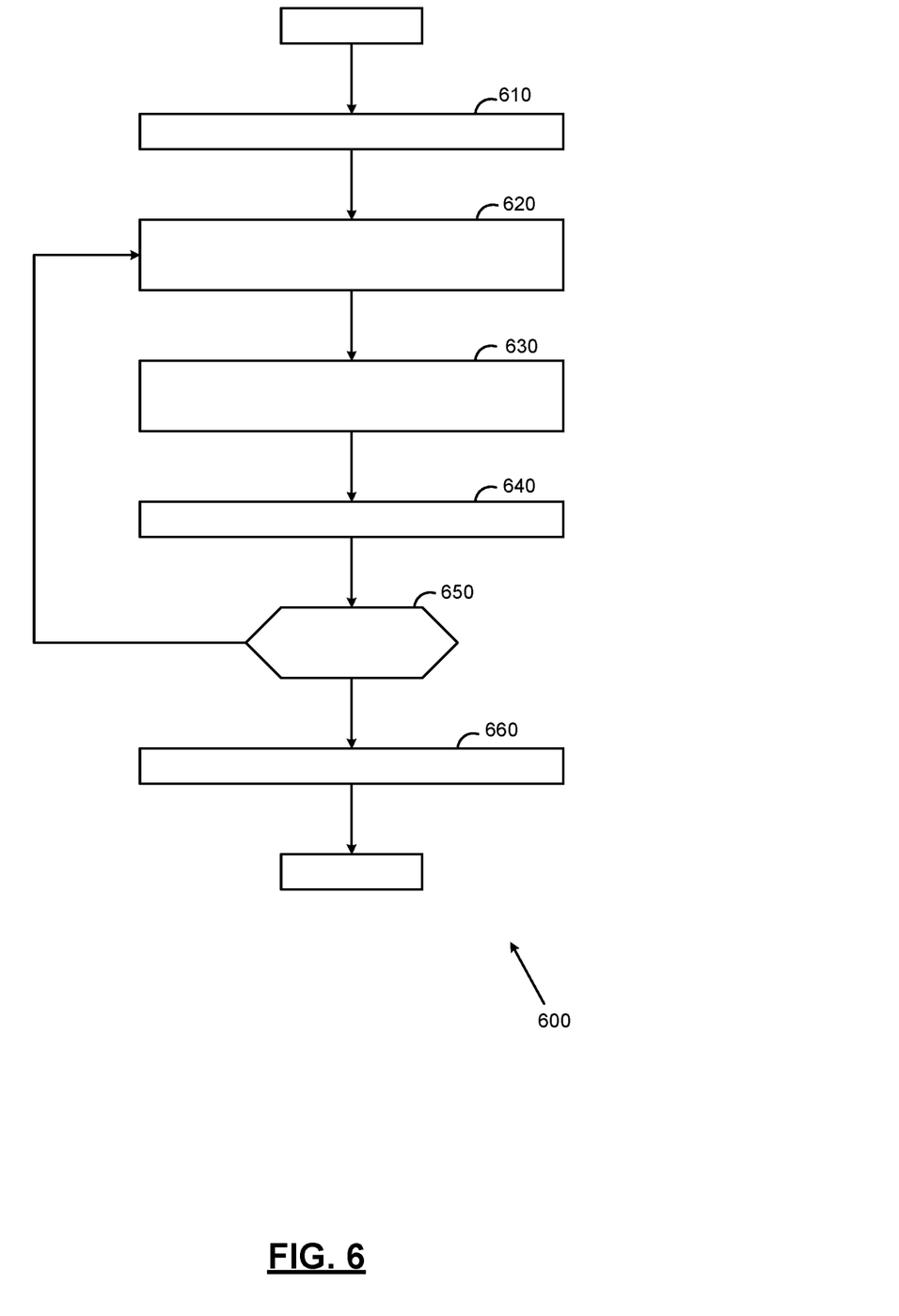
FIG. 6 is a flow diagram illustrating the operation of an AC generating module according to an embodiment of the present disclosure.

FIG. 6 is a flow diagram 600 illustrating the operation of the AC generating module 400 according to an embodiment of the present disclosure. Initially, the advanced computing module 185 may enable the AC generating module 400 in response to, for example, a determination that the battery 126 is too cold. In 610, the inverter gate drivers & motor current control module 440 determines the initial rotor position. Next, in 620, the inverter gate drivers & motor current control module 440 may determine the phase current amplitudes and direction (i.e., phase) for the φA, φB, φC currents based on the rotor position and the ambient battery temperature.

Next, in 630, the inverter gate drivers & motor current control module 440 may determine the ratio and direction of the three-phase voltages required to generate the PWM signals that control the three-phase inverter switches S1-S6. In 640, the inverter gate drivers & motor current control module 440 applies the PWM signals on the gate control signals S1-S6 outputs to the gates of the switches S1-S6. At this point, the AC generating module 400 applies the three phase currents φA, φB, φC in FIG. 2B to the windings of the electric motor 118 and the battery 126 begins to heat up.

In FIG. 650, the inverter gate drivers & motor current control module 440 determine if the battery temperature is greater than a minimum threshold value. If No in 650, the inverter gate drivers & motor current control module 440 returns to 620 and continues to determine the phase current amplitudes and direction for the φA, φB, and φC currents based on the rotor position and the updated battery temperature. If Yes in 650, then the AC generating module 400 may disable the three phase inverter and end heating of the battery 126.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for heating a battery in a vehicle including an electric motor, the system comprising:
an alternating current (AC) generating module coupled to the battery and the electric motor and configured to generate three alternating current (AC) phases, wherein a first AC phase is applied to a first winding of the electric motor, a second AC phase is applied to a second winding of the electric motor, and a third AC phase is applied to a third winding of the electric motor,
wherein the AC generating module is configured to generate the first AC phase, the second AC phase, and the third AC phase based on a rotor position of the electric motor to create substantially zero torque in the electric motor regardless of amplitudes of the three alternating current (AC) phases and to create a heating alternating current in the battery to heat the battery.

2. The system as set forth in claim 1, wherein the first AC phase has a first amplitude, the second AC phase has a second amplitude, and the third AC phase has a third amplitude and wherein the first amplitude is substantially equal to a sum of the second and third amplitudes.

3. The system as set forth in claim 2, wherein the first AC phase has a first phase, the second AC phase has a second phase, and the third AC phase has a third phase, wherein the second and third phases are substantially equal to 180 degrees out of phase with the first phase.

4. The system as set forth in claim 3, wherein the AC generating module comprises a rotor position sensor configured to detect the rotor position of the electric motor and a control module configured to receive the detected rotor position from the rotor position sensor, wherein the control module generates the first AC phase, the second AC phase, and the third AC phase based on the detected rotor position.

5. The system as set forth in claim 4, wherein the AC generating module further comprises a plurality of phase current sensors configured to detect the first AC phase in the first winding, the second AC phase in the second winding, and the third AC phase in the third winding, and wherein the control module adjusts the first AC phase, the second AC phase, and the third AC phase based on the detected first AC phase, the detected second AC phase and the detected third AC phase.

6. The system as set forth in claim 5, wherein the AC generating module further comprises a three phase inverter comprising a plurality of switches, wherein the plurality of switches comprises: i) a first switch and a second switch configured to couple the first winding to a positive terminal and a negative terminal of the battery, respectively, ii) a third switch and a fourth switch configured to couple the second winding to the positive terminal and the negative terminal of the battery, respectively, and iii) a fifth switch and a sixth switch configured to couple the third winding to the positive terminal and the negative terminal of the battery, respectively.

7. The system as set forth in claim 6, wherein the control module comprises switch-driving circuitry coupled to the plurality of switches and configured to generate a plurality of pulse-width modulated (PWM) signals that control the opening and closing of the plurality of switches.

8. The system as set forth in claim 7, wherein the control module is configured to receive a detected temperature of the battery and wherein the control module causes the AC generating module to generate the first AC phase, the second AC phase, and the third AC phase when the detected temperature is less than a threshold value.

9. A vehicle system comprising:
an electric motor;
a battery for supplying power to the electric motor; and
an apparatus for heating the battery when a temperature of the battery is less than a threshold value, the apparatus comprising:
an alternating current (AC) generating module coupled to the battery and the electric motor and configured to generate three alternating current (AC) phases, wherein a first AC phase is applied to a first winding of the electric motor, a second AC phase is applied to a second winding of the electric motor, and a third AC phase is applied to a third winding of the electric motor,
wherein the AC generating module is configured to generate the first AC phase, the second AC phase, and the third AC phase based on a rotor position of the electric motor to create substantially zero torque in the electric motor regardless of amplitudes of the three alternating current (AC) phases and to create a heating alternating current in the battery to heat the battery.

10. The vehicle system as set forth in claim 9, wherein the first AC phase has a first amplitude, the second AC phase has a second amplitude, and the third AC phase has a third amplitude and wherein the first amplitude is substantially equal to a sum of the second and third amplitudes.

11. The vehicle system as set forth in claim 10, wherein the first AC phase has a first phase, the second AC phase has a second phase, and the third AC phase has a third phase, wherein the second and third phases are substantially equal to 180 degrees out of phase with the first phase.

12. The vehicle system as set forth in claim 11, wherein the AC generating module comprises a rotor position sensor configured to detect the rotor position of the electric motor and a control module configured to receive the detected rotor position from the rotor position sensor, wherein the control module generates the first AC phase, the second AC phase, and the third AC phase based on the detected rotor position.

13. The vehicle system as set forth in claim 12, wherein the AC generating module further comprises a plurality of phase current sensors configured to detect the first AC phase in the first winding, the second AC phase in the second winding, and the third AC phase in the third winding, and wherein the control module adjusts the first AC phase, the second AC phase, and the third AC phase based on the detected first AC phase, the detected second AC phase and the detected third AC phase.

14. The vehicle system as set forth in claim 13, wherein the AC generating module further comprises a three phase inverter comprising a plurality of switches, wherein the plurality of switches comprises: i) a first switch and a second switch configured to couple the first winding to a positive terminal and a negative terminal of the battery, respectively, ii) a third switch and a fourth switch configured to couple the second winding to the positive terminal and the negative terminal of the battery, respectively, and iii) a fifth switch and a sixth switch configured to couple the third winding to the positive terminal and the negative terminal of the battery, respectively.

15. The vehicle system as set forth in claim 14, wherein the control module comprises switch-driving circuitry coupled to the plurality of switches and configured to generate a plurality of pulse-width modulated (PWM) signals that control the opening and closing of the plurality of switches.

16. The vehicle system as set forth in claim 15, wherein the control module is configured to receive a detected temperature of the battery and wherein the control module causes the AC generating module to generate the first AC phase, the second AC phase, and the third AC phase when the detected temperature is less than the threshold value.

17. A method for heating a battery in a vehicle including an electric motor, the method comprising:
  generating three alternating current (AC) phases based on a rotor position of the electric motor;
  applying a first AC phase to a first winding of the electric motor;
  applying a second AC phase to a second winding of the electric motor; and
  applying a third AC phase to a third winding of the electric motor,
  wherein the first AC phase, the second AC phase, and the third AC phase create substantially zero torque in the electric motor regardless of amplitudes of the three alternating current (AC) phases and generating the three AC phases creates a heating alternating current in the battery to heat the battery.

18. The method as set forth in claim 17, wherein the first AC phase has a first amplitude, the second AC phase has a second amplitude, and the third AC phase has a third amplitude and wherein the first amplitude is substantially equal to a sum of the second and third amplitudes.

19. The method as set forth in claim 18, wherein the first AC phase has a first phase, the second AC phase has a second phase, and the third AC phase has a third phase, wherein the second and third phases are substantially equal to 180 degrees out of phase with the first phase.

20. The method as set forth in claim 19, further comprising:
  detecting the rotor position of the electric motor; and
  generating the first AC phase, the second AC phase, and the third AC phase based on the detected rotor position.

* * * * *